(12) United States Patent
Lockett

(10) Patent No.: US 7,056,122 B2
(45) Date of Patent: Jun. 6, 2006

(54) WORD ISOLATING EDUCATIONAL TOOL

(76) Inventor: Dwight J. Lockett, 1473(A) Union Blvd., St. Louis, MO (US) 63113

( * ) Notice: Subject to any disclaimer, the term of this patent is extended or adjusted under 35 U.S.C. 154(b) by 11 days.

(21) Appl. No.: 10/716,339

(22) Filed: Nov. 18, 2003

(65) Prior Publication Data

US 2005/0106541 A1    May 19, 2005

(51) Int. Cl.
    *G09B 17/02* (2006.01)
(52) U.S. Cl. .................. 434/181; 434/178; 434/405; 40/352; 40/488; 116/240
(58) Field of Classification Search ............ 434/178, 434/179, 180, 181, 182, 183, 405, 206, 87, 434/348; 40/352, 488; 116/240
See application file for complete search history.

(56) References Cited

U.S. PATENT DOCUMENTS

| 140,135 | A | * | 6/1873 | Hildreth .................. 434/178 |
| 967,591 | A | * | 8/1910 | Warfield .................. 434/206 |
| 1,666,337 | A | * | 4/1928 | McDade .................. 434/348 |
| 1,816,760 | A | | 7/1931 | Barnowitz |
| 2,932,909 | A | | 4/1960 | Bosco |
| 2,959,872 | A | | 11/1960 | Rodgers |
| 3,172,214 | A | | 3/1965 | Aberge et al. |
| 3,200,514 | A | * | 8/1965 | Kopel .................. 434/348 |
| 3,200,517 | A | | 8/1965 | D'Agostino |
| 3,248,809 | A | | 5/1966 | Stifano, Jr. |
| 3,460,273 | A | | 8/1969 | Boyd |
| 3,477,146 | A | * | 11/1969 | Warneke .................. 434/405 |
| 3,704,533 | A | * | 12/1972 | Weber .................. 434/181 |
| 4,055,908 | A | * | 11/1977 | Greene et al. ............ 434/178 |
| 4,177,593 | A | * | 12/1979 | Lockey .................. 40/488 |
| 4,403,966 | A | | 9/1983 | Yang |
| 4,445,864 | A | | 5/1984 | Price |
| 4,643,680 | A | | 2/1987 | Hill |
| 4,770,635 | A | * | 9/1988 | Gabay .................. 434/178 |
| 5,618,180 | A | * | 4/1997 | Nathanson ............ 434/156 |
| 6,491,524 | B1 | | 12/2002 | Bender |

FOREIGN PATENT DOCUMENTS

GB            2235081 A    *    2/1991

* cited by examiner

*Primary Examiner*—Dmitry Suhol

(57) ABSTRACT

An educational device and method in which a user can learn the pronunciation and meaning of words using a word isolator with a window and a slide. The word isolator is placed over the unfamiliar word. The slide is manipulated to expose only a portion of the word at a time, thereby helping the user break down and identify the unfamiliar word.

4 Claims, 3 Drawing Sheets

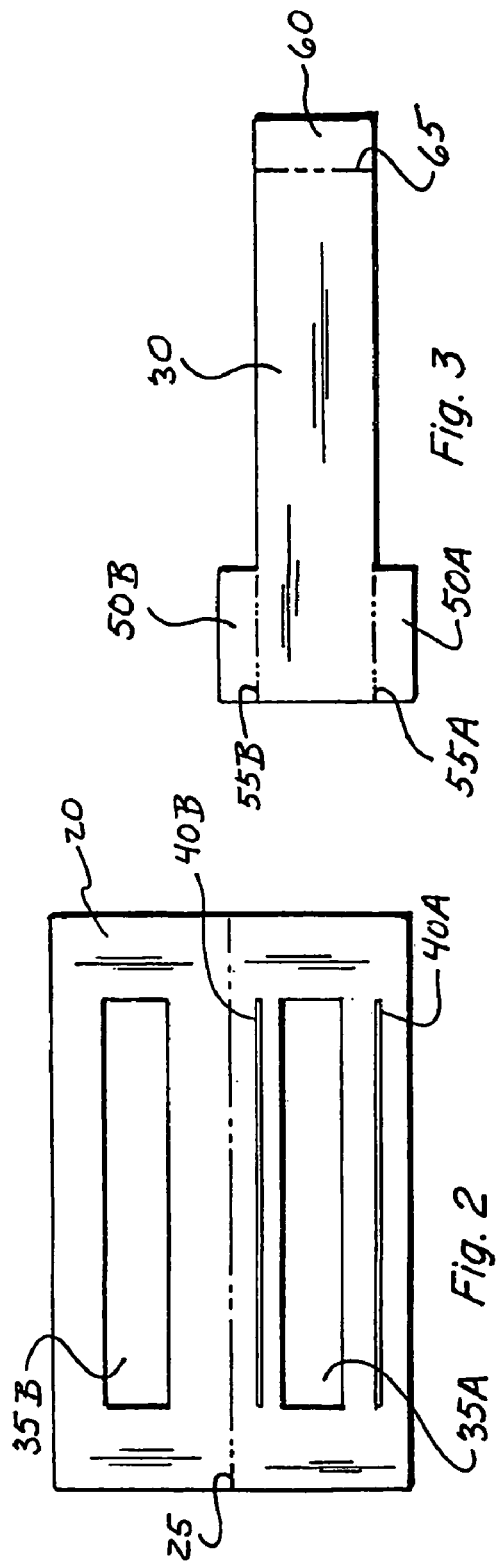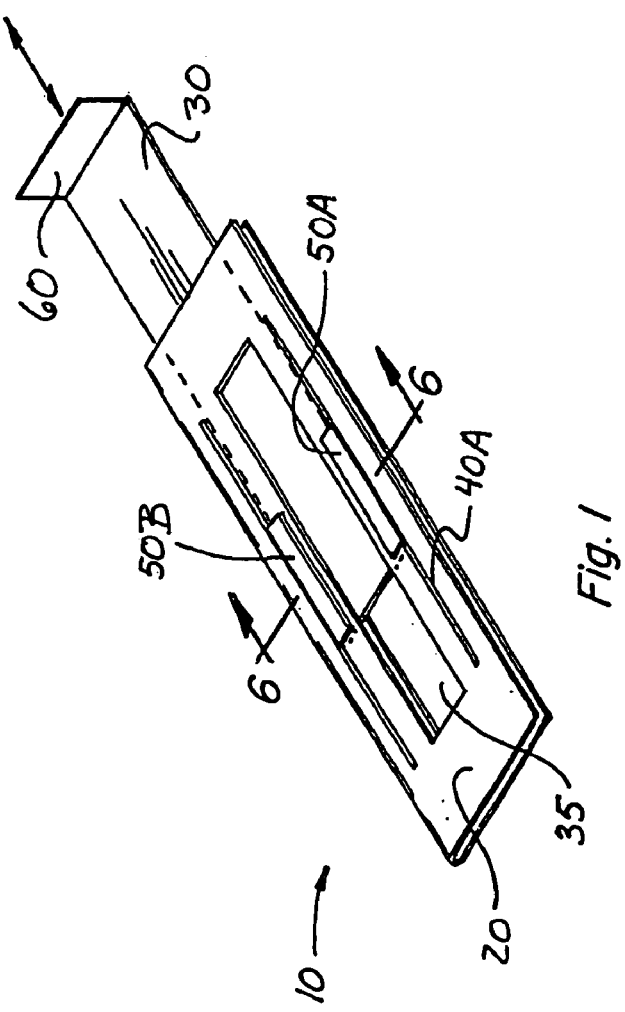

WORD ISOLATING EDUCATIONAL TOOL

BACKGROUND OF INVENTION

This invention relates generally to educational devices. More specifically, the invention relates to reading, spelling, pronunciation and vocabulary educational devices, and many other creative uses.

Methods and devices for teaching or learning how to read are known in the art. These methods often provide a reference guide with keys to pronunciation using pictures to show how a letter or group of letters sounds. Some use question and answer methods. Others use a technique of lining up the word with a picture representing that word. Some devices have a movable slide or wheel that changes the letters so the user can form his own words. Still others have a mechanism that exposes an additional letter of a word with each move for a predetermined list of words.

The prior art devices and methods have their value, but none of them addresses the needs of a slightly more advanced reader. In addition, the prior art devices are often large, rigid and cumbersome. Many of them only have a limited number of available words to teach. As the user develops more reading ability, he "outgrows" many of the prior art devices. Other prior art devices prove frustrating to more advanced readers because they are too inconvenient to carry and use with more advanced reading materials. Therefore, what is needed is a new device and method that will allow a user with some reading skills to ascertain the pronunciation and meaning of unfamiliar words.

It is an object of the present invention to provide a tool to enable one to learn the pronunciation and meaning of words.

In accordance with this object, this invention is intended to provide a method of using a tool that isolates a portion of a word to enable one to look to familiar syllables and root words to learn the pronunciation, meaning and remember the spelling of words.

Still other objects, advantages, distinctions and alternative constructions and/or combinations of the invention will become more apparent from the following description with respect to the appended drawings. Similar components and assemblies are referred to in the various drawings with similar alphanumeric reference characters. This description should not be literally construed in limitation of the invention. Rather, the invention should be interpreted within the broad scope of the further appended claims.

SUMMARY OF THE INVENTION

The present invention provides a device, a kit and a method for helping an individual learn the pronunciation, spelling and meaning of a word. The device comprises a word isolator including a window and a slide. The window is placed over the unfamiliar word. The slide can cover the entire word, expose just a portion of the word, or expose the entire word. In practice, the user, when faced with an unfamiliar word, places the word isolator over the word with the slide fully covering the word. He gradually moves the slide to expose part of the word through the window. The user then uses his knowledge of individual letter sounds, such as consonants and vowels, and multiple letter sounds, such as consonant blends, diphthongs, prefixes and suffixes to determine the pronunciation of a syllable. Then he exposes the word, syllable by syllable, until the user can pronounce the unfamiliar word.

The present invention can also be used to help determine the meaning of an unfamiliar word. The user places the word isolator over the text with the slide moved so the root of the unfamiliar word is exposed in the window. The user ascertains the meaning of the root of the word, and then he adds the meaning of the prefix or suffix to the word to learn the meaning of the unfamiliar word. In the case of a compound word, the user can expose one word of the compound word at a time to understand the meaning of the whole word. Use of the word isolator may even encourage some students to read because, just when frustration sets in at finding an unfamiliar word, the student is empowered with a learning tool that appears to be a toy.

In addition, the present invention can be provided in a kit form. The user obtains a kit which includes the parts of the word isolator, in unassembled form. The parts may be pre-cut individual pieces, a perforated template, or a pre-printed template for cutting. The user then follows the directions to assemble and use the word isolator.

The present invention can be provided in pattern form. Once the pattern is provided, the user can make the word isolator out of any convenient material, in any quantity. Once traced from the pattern, the user can enlarge or shrink the tracing to customize the word isolator for his particular use.

The word isolator can be used in various sizes and types of books. Unlike any known prior art, the structure of the word isolator allows it to flex along the curve of the page of a book. One embodiment contains a flap that can be lifted to expose the entire window for large fonts, or folded partially down to create windows of various heights for words written in smaller fonts.

The word isolator can be used in learning games. For example, the word starts totally concealed. The teacher tells the students a category. The word is revealed one letter at a time until a student guesses the word. Another game could include covering one of the student's spelling words. The student says one letter at a time until the word is spelled correctly. If the student makes a mistake, he covers the word and starts again.

Additionally, the word isolator can be used in other subjects. For example, the answers to math problems can be covered with the slide, and uncovered after the student works the problem. Adults and children learning English as a second language can use this device to help master their new language. It can be used as a study aid for any kind of fill-in-the-blank type of worksheet. Once the student fills in the worksheet, he uses the word isolator to hide the answers during review and self study. The word isolator will encourage the student to study because of the positive reinforcement felt as he uncovers each correct answer.

BRIEF DESCRIPTION OF THE DRAWINGS

FIG. 1 is a perspective view of the preferred embodiment of the word isolator with its slide shown within the window.

FIG. 2 is a template for the window portion of the preferred embodiment of the word isolator.

FIG. 3 is a template for the slide portion of the preferred embodiment of the word isolator.

DETAILED DESCRIPTION OF THE PREFERRED EMBODIMENT

As shown in FIGS. 1–3, the present invention may be formed from separable components referred to as the window portion 20, and the slide portion 30, which can be easily assembled with one another to form a completed construction. Window portion 20 includes slots 40A and 40B extending adjacent the top and bottom of an opening 35A. The slide portion 30 has tabs 50A and 50B near a first end of the slide portion 30, which tabs extend through slots 40A and 40B in the window portion 20 to secure the slide portion 30 and the window portion 20 to one another. A handle 60 is preferably provided near the second end of the slide portion 30 which extends from the window portion 20.

FIGS. 2 and 3 show the separable components of the word isolator 10. FIG. 2 shows a template for the window portion 20 of the word isolator 10. Openings 35A and 35B are cut so they align with one another when the window portion 20 is folded along line 25. Slots 40A and 40B are preferably cut so they are approximately equidistant from the opening 35A. FIG. 3 shows a template for the slide portion 30 of the word isolator 10. To construct the word isolator 10, tabs 50A and 50B are folded at lines 55A and 55B, respectively to form flanges, and they are inserted into slots 40A and 40B, respectively, of window portion 20. Then tabs or flanges 50A and 50B are folded down against the window portion 20, creating a "wrapping" effect wherein the tabs or flanges 50A and 50B of the slide portion 30 are wrapped over the window portion 20. Tabs or flanges 50A and 50B, when folded against the window portion 20, engage the slide portion 30 with the window portion 20. Next, the window portion 20 is folded along line 25, lining up openings 35A and 35B. Finally, the handle 60 is created by folding slide portion 30 at line 65. An alternate way to engage the window portion and slide portion could include providing tabs or flanges in place of the slots on the window portion as described above, and "wrapping" those tabs or flanges around a slide portion without tabs or flanges.

Figure 4:
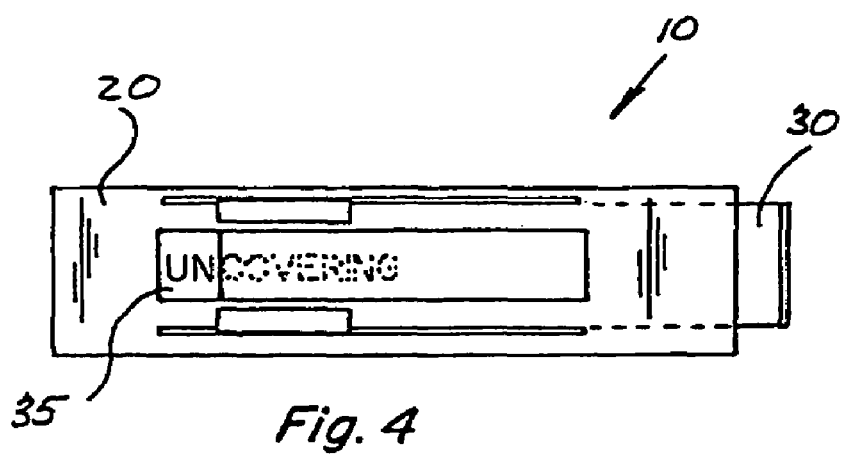
FIG. 4 is a top view of the preferred embodiment of the word isolator shown exposing part of a word.
Figure 5:
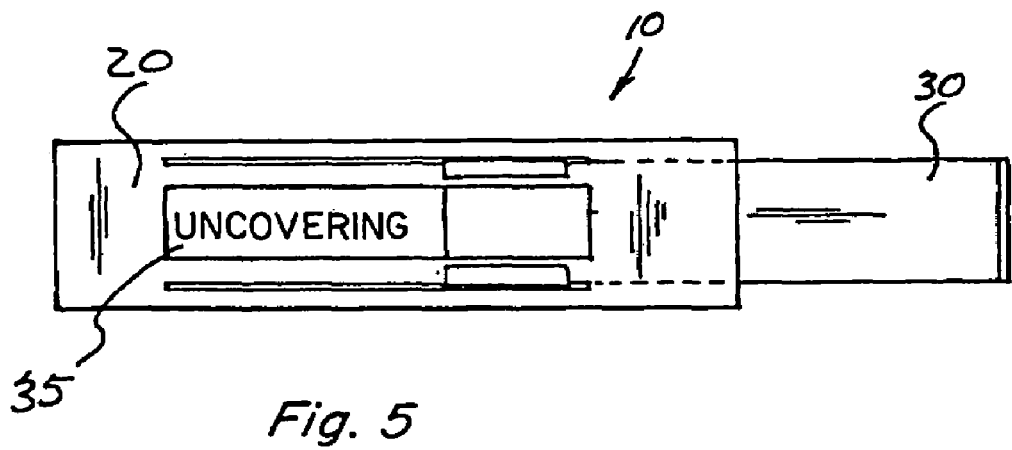
FIG. 5 is a top view of the preferred embodiment of the word isolator shown exposing the whole word.

Use of the word isolator is shown in FIG. 4. The slide portion 30 is placed inside the window portion 20 covering most of the unfamiliar word UNCOVERING. The letters UN show through the opening 35, and the letters COVERING are masked by the slide portion 30. The user first determines the sound of the letters in the first syllable UN, then he uncovers the next portion, COV and determines its pronunciation. He continues uncovering the syllables ER and ING until he determines the pronunciation of the entire word. The user also notes the meaning of the prefix UN, the root word COVER, and the suffix ING to learn the meaning of the word. FIG. 5 shows the entire word UNCOVERING exposed by the slide portion 30 in the opening 35.

Figure 6:
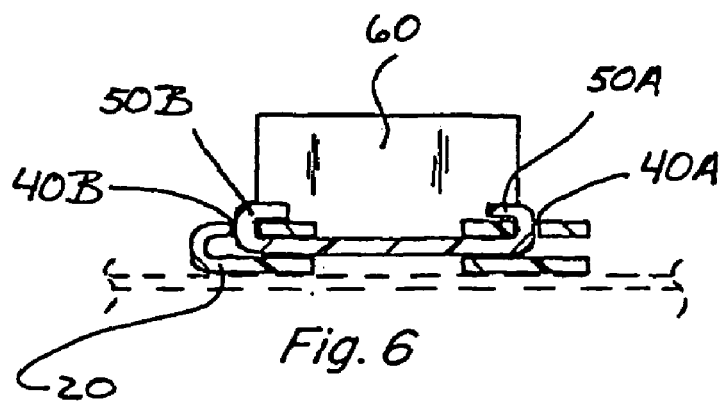
FIG. 6 is a side view of the preferred embodiment of the word isolator along line 6—6 of FIG. 1.

FIG. 6 shows a cross section of the word isolator looking along the line 6—6 of FIG. 1. The window portion 20 is shown folded along line 25. The handle 60 is shown folded up along line 65. The tabs 50A and 50B are folded at lines 55A and 55B respectively and inserted into slots 40A and 40B respectively. Tabs 50A and 50B are then folded down and in towards the opening 35A of the word portion 20 creating the "wrapping" effect referenced above.

Figure 7:
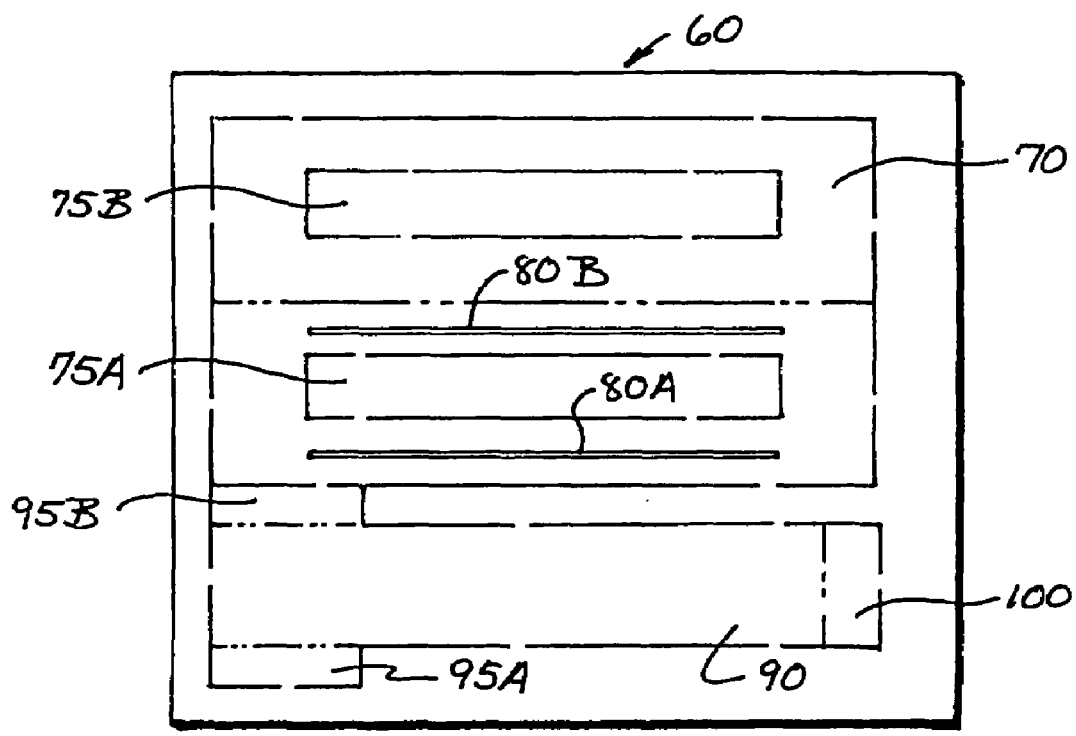
FIG. 7 is one embodiment of a template for a user assembled word isolator.

FIG. 7 shows an embodiment of the present invention when provided in a template form. The template 60 includes the window portion 70 and the slide portion 90 with markings for the window cutouts 75A and 75B, the slots 80A and 80B for the slide portion flaps 95A and 95B, and the handle 100. The template 60 may include perforated lines for easy removal of the pieces, or it may be pre-printed for cutting.

Figure 8:
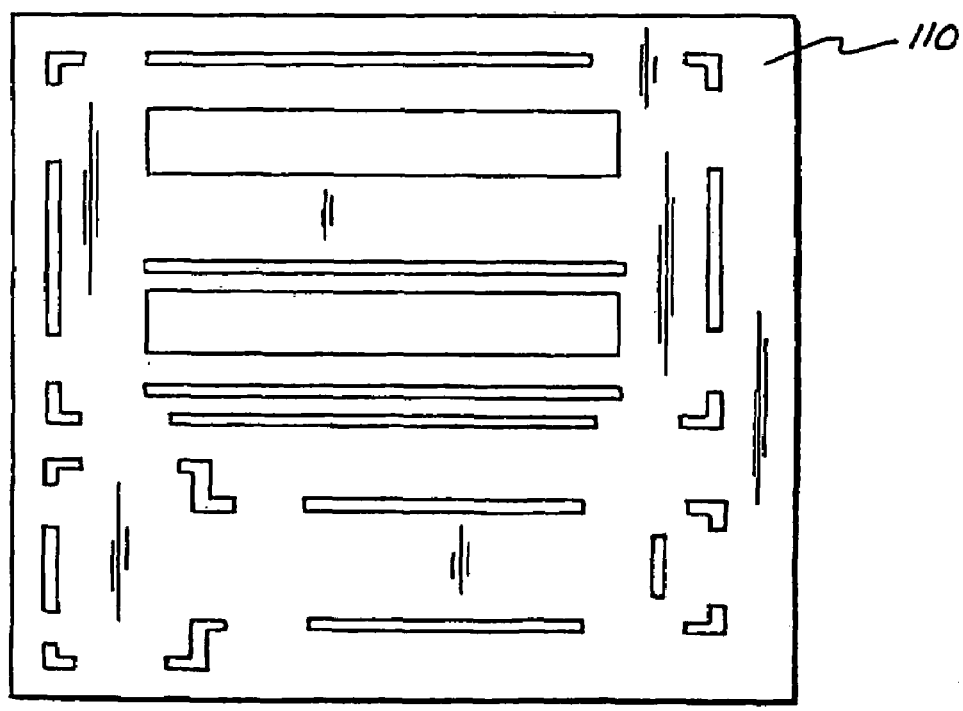
FIG. 8 is one embodiment of a pattern for use in creating multiple or custom sized word isolators.

FIG. 8 shows an embodiment of the present invention when provided in pattern form. Once the pattern 110 is obtained, the user can make the word isolator out of any convenient material, in any quantity. After tracing an outline from the pattern 110, the user can enlarge or shrink the tracing to customize the word isolator for his particular use. For example, a teacher would use a large word isolator at the chalk board for demonstration purposes, while the students use smaller ones at their desks. The word isolator could also be customized to accommodate various fonts as found in many early reading books. The word isolator may contain a flap substantially the same size as the window opening. That flap can be connected along the top or bottom of the opening and folded or bent in various positions to cover all of the window or only a portion of the window. The flap can be lifted to expose the entire window for large fonts, or folded partially down to create windows of various heights for words written in smaller fonts.

The word isolator can be used in learning games. For example, the teacher starts with a word or an answer totally concealed. The teacher tells the students the category for the word, or asks a question. The word is revealed one letter at a time until a student guesses the correct answer. Another game could include covering one of the student's spelling words. The teacher points to a student and that student says the first or next letter of the spelling word. Play continues until the word is spelled correctly. The students could use the word isolator for independent play and study also. The student spells the word to himself uncovering one letter at a time. If the student makes a mistake, he covers the word and starts again.

Although the invention has been described in terms of specific embodiments and applications, persons skilled in the art can, in light of this teaching, can generate additional embodiments without exceeding the scope or departing from the spirit of the claimed invention. In addition, specific features of the invention are shown in some drawings and not in others for convenience only, as each feature may be combined with any or all of the other features in accordance with the invention. Accordingly, it is to be understood that the drawings and description in this disclosure are proffered to facilitate comprehension of the invention and should not be construed to limit the scope thereof.

What is claimed is:

1. A kit for an assembleable educational device for isolating words appearing on a flat surface, comprising:
  a sheet-like member forming a base portion, said sheet-like member being foldable over on to itself to define a generally thin, elongated configuration having upper and lower portions and an intermediate slot therebetween, said upper portion at least partially overlapping said lower portion, said upper and lower portions each including a generally rectangular elongated opening therein, said elongated openings being generally sized and aligned with one another to form an aperture through the folded configuration and to permit observation from a point above said upper portion through said aligned openings of a location below said lower portion, said aperture defining a viewing window, said upper portion including a slit generally parallel to said elongated opening therein and the fold in said sheet-like member,
  a thin, elongated strip forming a slide member, said strip sized and dimensioned to fit within said intermediate slot between the upper and lower portions of said base portion and to be slidably movable therein to substantially fully occlude said viewing window when in a first position, to substantially fully expose said viewing window when in a second position, and to partially occlude said viewing window when intermediate said first and second positions, said strip including at least one projection portion sized and dimensioned to extend through said slit in said upper portion of said base portion and to move therealong as said slide member is slidably moved relative to said base portion, said slide member including a portion extending beyond said base portion even when said slide member is positioned to substantially fully occlude said viewing window, said extending portion forming a handle portion, said slide member positionable within said slot of said base portion with said projection portion extending through said slit in said upper portion of said base portion when said sheet-like member is in said folded configuration to form an assembled word isolator device, said assembled word isolator device positionable upon a generally flat surface to encompass text appearing thereon within the outline of the viewing window and to allow the viewing of at least a portion of said encompassed text as said slide member is slidably moved relative to said base portion while said base portion remains in such position, said handle portion being movable by a user to effect slidable movement of said slide member relative to said base portion to control the degree of occlusion of the viewing window and the amount of text viewable through said viewing window.

2. A template for an assembleable educational device for isolating words appearing on a flat surface, comprising:

a sheet of material having markings thereon defining a detachable base portion component and a detachable slide member component, said detachable base portion component being sized and dimensioned to be, when detached from said sheet of material, foldable over on to itself to define a generally thin, elongated configuration having upper and lower portions and an intermediate slot therebetween, said upper portion at least partially overlapping said lower portion, said upper and lower portions each including a similarly sized and dimensioned detachable generally rectangular elongated portion each of which is detachable to effect a generally rectangular elongated opening, said elongated openings being generally sized and aligned with one another to form an aperture through the folded configuration and to permit observation from a point above said upper portion through said aligned openings of a location below said lower portion, said aperture defining a viewing window, said upper portion including an openable slit located generally parallel to said elongated opening in said upper portion and the fold in said sheet-like member, said slide member component being sized and dimensioned to be, when detached from said sheet of material, a thin, elongated strip sized and dimensioned to fit within said intermediate slot between the upper and lower portions of said base portion and to be slidably movable therein to substantially fully occlude said viewing window when in a first position, to substantially fully expose said viewing window when in a second position, and to partially occlude said viewing window when intermediate said first and second positions, said strip including at least one foldable projection portion sized and dimensioned, when folded to project from the principal plane of said slide member at an angle thereto, to extend through said slit in said upper portion of said base portion and to move therealong as said slide member is slidably moved relative to said base portion, said slide member including a portion extending beyond said base portion even when said slide member is positioned to substantially fully occlude said viewing window, said extending portion forming a handle portion, when detached from said sheet of material, said slide member component and said base portion component being positionable with one another with said slide member component within said slot of said base portion component with said projection portion of said slide member component extending through said slit in said upper portion of said base portion component when said component is in said folded configuration to form an assembled word isolator device, said assembled word isolator device positionable upon a generally flat surface to encompass text appearing thereon within the outline of the viewing window and to allow the viewing of at least a portion of said encompassed text as said slide member component is slidably moved relative to said base portion component while said base portion component remains in such position on the generally flat surface, said handle portion being movable by a user to effect slidable movement of said slide member component relative to said base portion component to control the degree of occlusion of the viewing window and the amount of text viewable through said viewing window.

3. The template of claim 2 wherein said markings include scores in said sheet of material along the points of detachment of said detachable components from said sheet of material, along the points of detachment of said generally rectangular elongated portions of said upper and lower portions of said base portion component from said base portion component, and at the location of the openable slit in said upper portion of said base portion component.

4. The template of claim 3 wherein said sheet of material has a thickness rating in the range of approximately 16–150 lbs.

* * * * *

UNITED STATES PATENT AND TRADEMARK OFFICE
CERTIFICATE OF CORRECTION

| | | |
|---|---|---|
| PATENT NO. | : 7,056,122 B2 | Page 1 of 1 |
| APPLICATION NO. | : 10/716339 | |
| DATED | : June 6, 2006 | |
| INVENTOR(S) | : Dwight J. Lockett | |

It is certified that error appears in the above-identified patent and that said Letters Patent is hereby corrected as shown below:

Title Page, Item [57]

In the Abstract, line 2, delete "and meaning".

Signed and Sealed this

Twentieth Day of March, 2012

David J. Kappos
*Director of the United States Patent and Trademark Office*